United States Patent Office 3,366,241
Patented Jan. 30, 1968

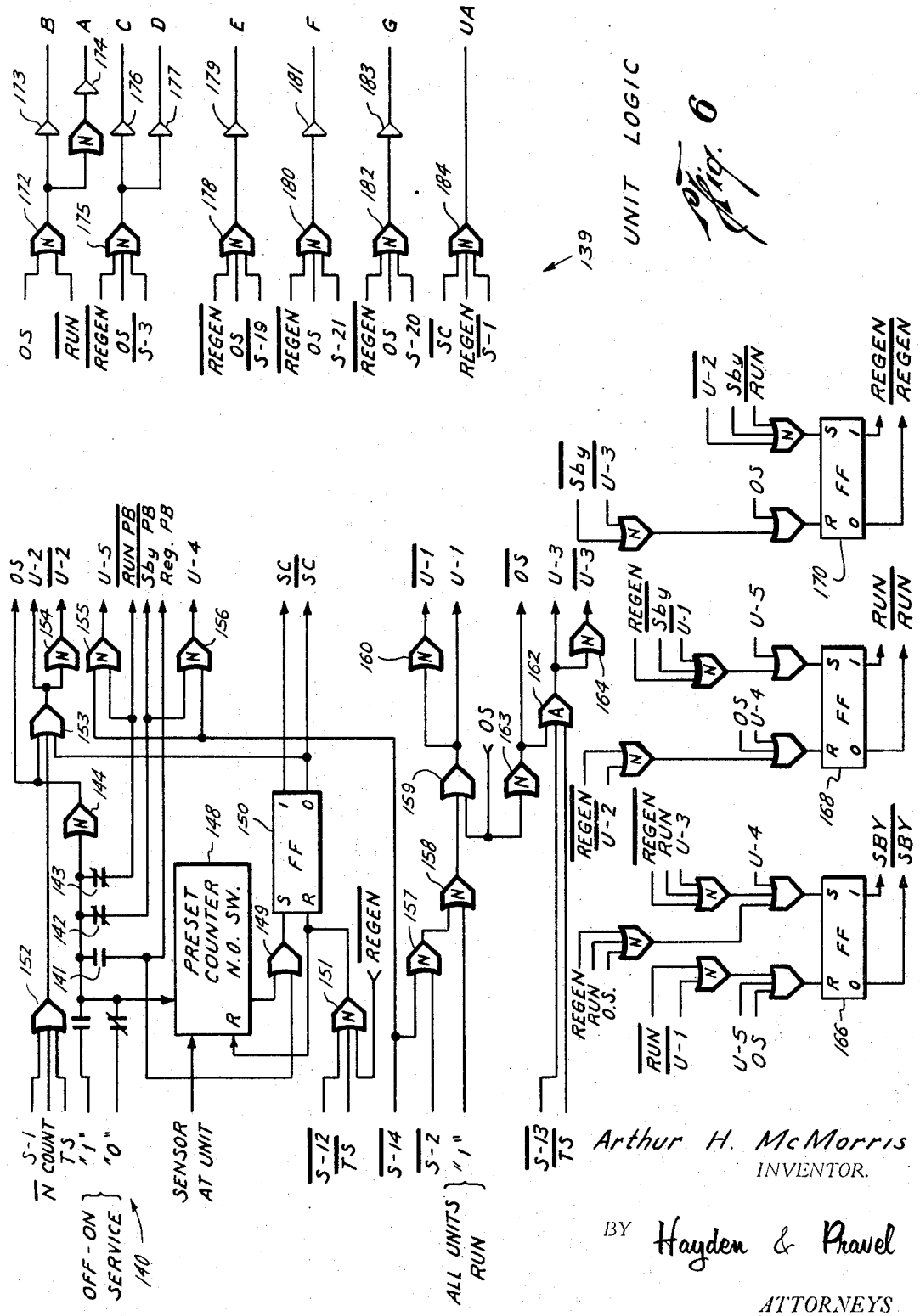

3,366,241
CONTROL SYSTEM FOR WATER TREATMENT
APPARATUS
Arthur H. McMorris, Houston, Tex., assignor to Houston
Engineering Research Corporation, a corporation of
Texas
Filed Oct. 8, 1965, Ser. No. 494,040
14 Claims. (Cl. 210—96)

ABSTRACT OF THE DISCLOSURE

In water treatment plants having a plurality of treatment tanks with ion-exchange media therein subject to periodic depletion, apparatus preferably including a sensor means for each of the treatment tanks to ascertain depletion of the ion exchange media therein, sequential scanning means for periodically testing each of the sensor means to ascertain depletion of ion exchange media in one of the treatment tanks; said apparatus further including memory means preferably having a stored regeneration program including a number of steps for sequentially disconnecting the treatment tank having depleted media therein from the source of untreated water, providing regeneration solution to the isolated treatment tank until the ion exchange media therein is regenerated, providing various rinses to said tank and then returning the treatment tank to connection with the source of untreated water.

---

This invention relates to a control system for water treatment apparatus, and more particularly, pertains to a means whereby a water treatment plant is placed on line until the treatment chemicals therein are exhausted, whereupon the apparatus of the present invention controls the recharging of the exhausted chemicals to return the treatment plant to an on line condition.

The treatment and purification of water encounters many problems including the removal of "hardness" from water or the deionization of salt water to obtain sufficiently pure water fit for industrial uses. In both cases, a chemical treatment is known for removal of the impurities making the water unfit. Specifically, water hardness results from calcium and magnesium salts in the water, while sea water is highly ionized due to the solution therein of sodium chloride.

The technique of removing hard salts from water involves interchange of cations when the hard water is passed through sodium zeolite resin usually contained in a treatment tank. As will be appreciated, the sodium zeolite exchanger has a finite life and is depleted after extended treatment. The present invention controls recharging of the depleted resin wherein a regeneration solution is passed therethrough which reverses the cation exchange of the resin to restore the resin to its original condition in preparation for further operations. In like manner, regeneration solution is passed through treatment tanks containing various resins to deionize salt water. Therefore, it is an object of the present invention to provide a control system for operating a water treatment plant of any nature wherein the ion exchange resins are recharged without interrupting operation of the plant.

Another object of the present invention is to provide a new and improved control system for operation with multiple treatment tanks wherein regeneration of the resin in one of the treatment tanks does not affect operation of the remainder of the treatment plant.

One object of the present invention is to provide a new and improved control system for a treatment plant which takes a unit "off the line"; regenerates the resin in the unit; and places the unit back on line while automatically controlling the valves connecting the unit with the treatment plant to avoid interruption of routine operations elsewhere.

Another object of the present invention is to provide a new and improved control unit for a water purification plant having a multitude of valves and various pressure differentials acting thereacross wherein the unit controls the valves so that differential pressures will not urge regeneration solutions (saline, basic, or acidic liquids) into lines communicating with the treated and purified water.

A further object of the present invention is to provide a regeneration cycle including adjustable washing operations and rinsing operations so that the treatment is related to the condition of the unit being treated.

Another object of the present invention is to provide a new and improved control circuit for a water treatment plant operable with any desired number of individual treatment units in the structure.

The preferred embodiment of this invention will be described hereinafter together with other features thereof, and additional objects will become evident from such description.

The invention will be more readily understood from a reading of the following specification and by reference to the accompanying drawings forming a part thereof wherein an example of the invention is shown and wherein:

FIG. 6 is a schematic diagram illustrating the logic associated with each of the treatment units.

Figure 1:
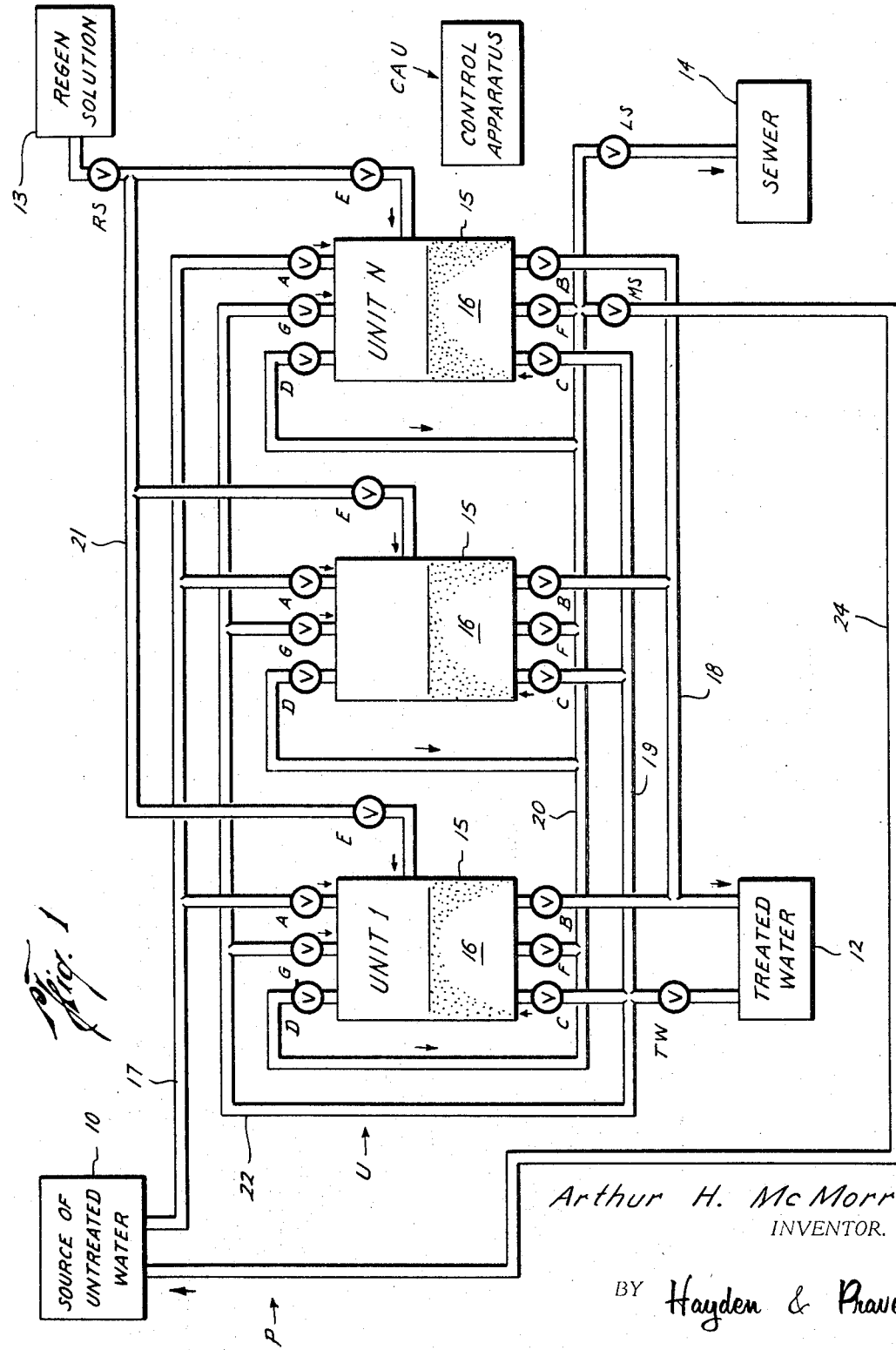
FIG. 1 is a schematic plumbing diagram of a water treatment plant which includes a plurality of water treatment units.

In the drawings, the letter P in FIG. 1 refers generally to the treatment plant having a plurality of treatment units indicated generally by the letter U. The conrol apparatus of the present invention is indicated in FIG. 1 at CAU. When one of the units U (the number of units is N units) is exhausted by depleting the resin therein, the control apparatus CAU takes the depleted unit U off the line for regeneration. A typical regeneration cycle includes backwashing of the unit to remove sediment in the resin and a subsequent washing with a regeneration solution. As will be appreciated by those familiar with the chemistry of resin regeneration, the solution renews the resin for further use. On completion of the regeneration, the regeneration solution is drained away and the treatment unit is thereafter rinsed. It is well known that a relatively slow first rinse is particularly beneficial in removing the last traces of the regeneration solution and the slow rinse is thereafter preferably followed by two fast rinses which further carry away and purify the exchange resin. The apparatus CAU of the present invention is particularly adapted to control the operation of the treatment plant.

Considering the invention more in detail, attention is first directed to FIG. 1 of the present invention which illustrates the treatment plant P in schematic detail. In the treatment plant P, there is provided a source of untreated water which is represented schematically at 10. The untreated water is processed by one of the units U and is then conducted to a storage facility 12 for receiving the treated water. During continued operation of the treatment plant, the source of untreated water continues to deliver the untreated water to the plant P and the fully purified water is delivered therefrom to the treated water storage facility 12 for accumulation or distribution.

The treatment plant also includes a container or other apparatus for receiving a regeneration solution, such container being indicated by the numeral 13 in FIG. 1, as will be described in greater detail hereinafter. Also represented symbolically in FIG. 1 is a sewer 14 for disposal of the regeneration solution after it has been used in one of the treatment units U. By way of example and not limitation, the source of the untreated water may be any source of hard water such as fresh water streams flowing through certain geological formations. Also, the untreated water may actually be provided by some body of salt water wherein the treatment plant P is utilized to remove the excessive ionization found in salt water. It may be found necessary to mechanically filter or otherwise remove sediment from the untreated water, if such constitutes a problem; however, this is not encompassed by the present invention and is noted only for purposes of explanation. The treated water container 12 may be a storage tank accumulating water for delivery to a distribution system, or some other consumer. The container for storing the regeneration solution is preferably a tank or the like capable of holding a measured quantity. The tank 13 is preferably provided with a probe (not shown in FIG. 1) which has a spaced relationship relative to the maximum level of regeneration solution in the tank 13 so that the probe signals the delivery of a measured quantity of regeneration solution to the control apparatus CAU of the present invention. Additional details will be noted concerning the low level probe in the tank 12 hereinafter. Obviously, the sewer 14 is any adequate waste disposal system.

Certain things are not shown in FIG. 1 but should be mentioned since they co-operate with the present invention. Each of the valves includes a device indicating closure of the valve. Preferably, when a valve is opened, a signal is generated which is used by the control apparatus CAU of the present invention to ascertain alarm conditions wherein certain combinations of valve operation are found undesirable. The treatment units are provided with a device indicating exhaustion of the resin therein. If the source of untreated water includes a relatively constant level of hardness or excessive ionization, then depletion of the resins in the units U can be ascertained by placing a flow meter on the output of the units. Thus, if it is found that one hundred thousand gallons will deplete a treatment unit, a preset counter (as will be described) is utilized to ascertain exhaustion of the ion exchange media in the treatment unit. On the other hand, if it is found that the source of untreated water 10 varies in degree of pollution, then it may be necessary to utilize a sensor connected to the treated water output by the units U to ascertain depletion or exhaustion of the resins. In the case of salt water, adequate deionization may be ascertained by measuring the conductivity of the water output by the treatment unit. Also, apparatus is available for ascertaining the hardness of water.

The units U each include a tank 15 containing a bed of resins 16. The resins 16 are arranged in the usual fashion to provide porous communication through the tank 15 so that liquid may enter at the upper end and flow through the bed of resin 16 and be removed from the bottom of the tank 15. The tank 15 is provided with various valves denoted by the letters A through G, inclusive, which will be described. It should be noted that all of the units U, comprising N units in number, are provided with identical valving arrangements in communication with the conduits or pipes shown in FIG. 1. Specifically, the plant P includes the conduit 17 which communicates with the source of untreated water 10 to deliver liquid to the treatment units U under control of the valve A. Treated water is taken from the plurality of treatment units U through the valve B at the bottom of the tanks 15. The valves B connect to the conduit 18 which extends to the tank 12 containing the treated water.

It is known that backwashing of the resin 16 is useful in regeneration and toward this end, a conduit 19 is provided for taking treated water from the tank 12 to a valve C connected to each of the tanks 15. The backwash enters the tank 15 through the valve C and passes upwardly through the resin 16 and out through a valve D provided at the upper end of the tank 15. The valves D are connected to a conduit 20 which opens to the sewer 14 through the valve LS. Regeneration solution is provided to the treatment units U by a conduit 21 which connects to the valves E attached to the sides of the tanks 15. On regeneration, the valves F are opened to the conduit 20 to drain the regeneration liquid to the sewer 14.

A conduit 22 is connected to the upper end of each of the tanks 15 by the valve G to provide rinse fluid to the tanks 15. The rinse water passes through the valves F into the conduit 20 and thence to the sewer 14. On occasions, it may be that the water used in the last rinse is sufficiently pure that it may be returned to the source 10, and easily repurified. A conduit 24 is communicated to the conduit 20 by a valve MS to return rinse water to the source 10. The apparatus also includes the valve TW connected to the tank 12 for controlling the use of treated water and the valve RS which communicates with the tank 13.

Reference is made to a text book offered by R. K. Richards, which is entitled "Arithmetic Operations in Digital Computers" which was published in 1955. In Chapter 2 of the book, Boolean algebra is discussed and then applied to computer components. In dealing with binary signals, two signal levels are present and are symbolically denoted as being either zero and one, or alternatively, false or true. An OR gate is described in the text as providing a true output when any one or a number of inputs is true. An AND gate provides a true output only if all inputs are true. An inverter merely reverses a single signal to provide the opposite state output. A NOR gate and a NAND gate is formed by connecting an inverter to the output of an OR gate or an AND gate, respectively. At Page 47 of the text, bistable circuit devices are described. Bistable circuit devices are most often called flip-flops and these devices provide a binary output at an output terminal having a state determined by the triggering sequence to the two input terminals. That is to say, they maintain their output state even after the input signal which causes the output signal is removed. In effect, they provide a memory function and retain the output signal for an indefinite length of time.

Figure 2:
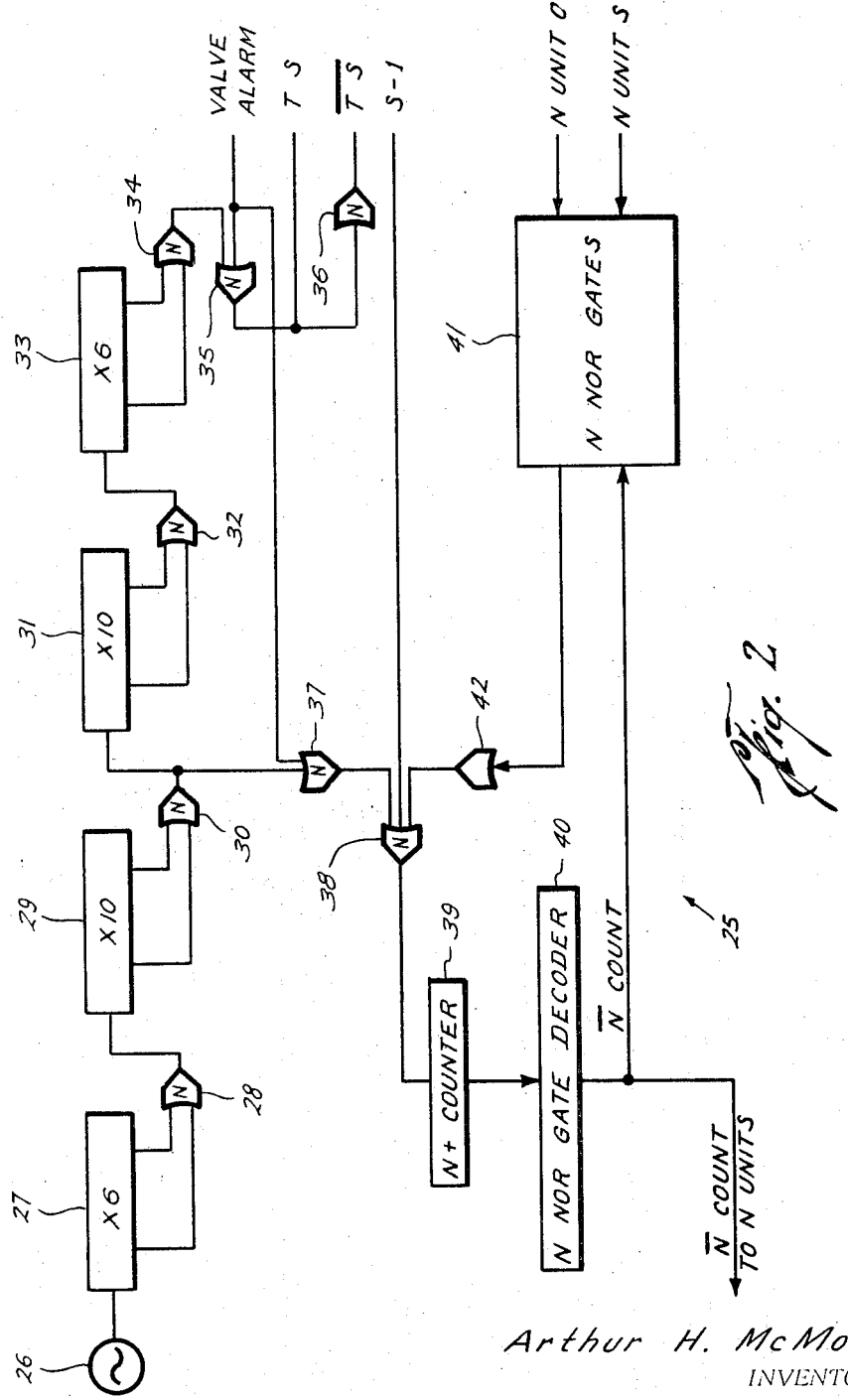
FIG. 2 is an electrical schematic diagram of the timing circuitry of the present invention.

Attention is next directed to FIG. 2 of the drawings which illustrates the timing circuitry indicated generally by the numeral 25 for operation of the apparatus CAU of the present invention. The timing circuitry 25 includes a signal source 26 providing a signal having a fixed frequency. As a practical matter, it is found that the line frequency which is customarily sixty cycles per second is quite sufficient for purposes of the present invention. A count-down circuit 27 is connected to the frequency source 26. A NOR gate 28 is connected to an additional counter 29. The counter 27 generates an output pulse at the NOR gate 28 at a rate of ten cycles per second; the counter 29 provides an output pulse once every second at the NOR gate 30. In like manner, the by ten counter 31, the NOR gate 32, and the by six counter 33 provide an output pulse once every minute at the NOR gate 34. The NOR gate 34 is communicated with a NOR gate 35 which also receives signals to be discussed hereinafter. The NOR gate 35 forms a timing signal TS, and a NOR gate 36 connected to the NOR gate 35 forms a $\overline{TS}$ signal. It will be noted that the timing signal TS occurs once every minute.

The NOR gate 30 which outputs a signal once every second is communicated to NOR gate 37 which is also connected to the valve alarm signal provided to the NOR gate 35 for forming an additional timing signal having a frequency of one pulse every second. The output of the NOR gate 37 is communicated with the NOR gate 38 which is connected to a counter 39 as will be described.

An additional input to the gate 38 is the signal S–1 (to be fully described) which signal, in a word, tells the timing circuitry that the apparatus is in the scanning mode of operation. By way of background, the present invention is adapted to co-operate with any number of units U in the treatment plant P. Any one of the units U in the treatment plant P may become depleted at any time during operation of the plant P. Therefore, scanning under control of the timing circuitry 25 cyclically inspects each of the units U in the treatment plant P. The scanning rate is controlled by the pulses output by the NOR gate 37 into the gate 38 when permitted by the signal S–1.

The output of the NOR gate 38 communicates with the counter 39 to effect the scanning of the plurality of treatment units U. Since the number of units is N, the counter 39 should count at least to N, or even to a number greater than N. Those skilled in the art might supply a binary chain counter capable of counting eight, sixteen, thirty-two, sixty-four, etc., some number greater than N. If the counter 39 has a greater count capacity than the number of units, certain counts will not be used. However, no particular consequence attaches to such results. On the other hand, those skilled in the art can provide a counter capable of counting only to N.

The output of the counter 39 is in the form of a plurality of signals representing the values of one, two, four, eight, and so on. A decoder 40 is connected to the counter 39 and preferably comprises N number of NOR gates for decoding the output of the counter 39. The output of the decoder is represented in FIG. 2 as the $\overline{N}$ count which is utilized in additional circuitry to be described.

The $\overline{N}$ count is conducted by N conductors to a plurality of NOR gates represented at 41. The signal on each of the conductors is input to a NOR gate which has two additional inputs. The additional signals are the OS signal (which will be described) and the SC signal. The OS signal indicates that the one of the units has been switched out of service and causes the scanning circuitry to skip over the unit. However, if one of the units should be on line and it should be ascertained by way of the sensor, counter, or other meanings provided therefor that such unit has depleted its regeneration chemical, the SC signal indicates that service is complete and that the tank is not regenerated.

The plurality of output signals from the NOR gates 41 is input to the OR gate 42 which provides an input to the gate 38. A binary one from the gates 41 passes through the OR gate 42 and requires a binary zero output from the gate 38 for the duration of the existence of the service complete condition. The SC signal halts scanning until the depleted unit is either placed in the out-of-service condition or has been regenerated by the apparatus of the present invention.

The apparatus CAU provides a program for regenerating the resins in the units U. The apparatus in FIG. 3 includes a counter 48 (capable of counting to sixteen) communicated with a plurality of inverters 49 for forming the indicated signals. The present invention preferably uses a program including less than sixteen steps which are obtained by a plurality of NOR gates indicated generally at 50. Of course, the counter 48 can provide sixteen steps in the program, if needed, but only thirteen are incorporated in the preferred program. The NOR gates 50 form the thirteen signals indicated in FIG. 3 by their mnemonic functions. Some of the gates 50 are NOR gates (S–2, S–6, S–8, S–10, S–11, and S–12) while the remainder are OR gates. Also, the inverse signals are provided by appropriately-connected NOR gates on all outputs except S–6, S–8, and S–10.

Figure 3:
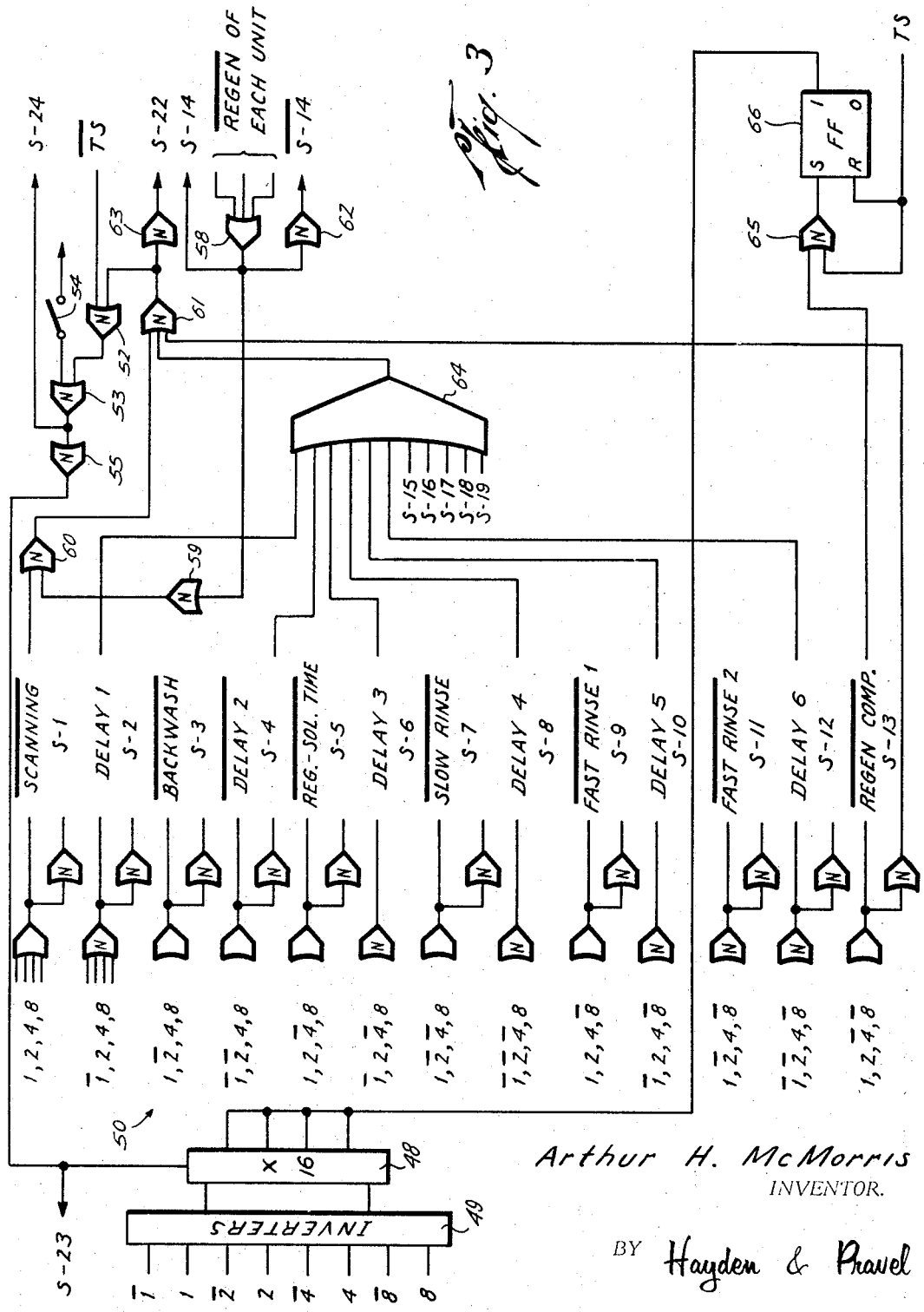
FIG. 3 is an electrical schematic diagram illustrating the regeneration programmer of the present invention.

The basic timing signal of the control apparatus CAU is provided to the circuitry shown in FIG. 3 wherein the timing signal TS is input to a NOR gate 52. The output of the NOR gate 52 communicates with a NOR gate 53 having an input from a switch 54. The switch 54 provides a manual advance signal to step the program to the next step. However, the automatic advance signal from the NOR gate 52 customarily controls the program. The output of the NOR gate 53 is inverted by the NOR gate 55 and is connected to the input of the counter 48. The output of the gate 53 forms the signal S–24 and the input to the counter 48 is the signal S–23.

It can be seen from the foregoing description that the counter 48 is advanced in synchronism with the timing pulses TS when in the automatic advance mode of operation.

As will be described hereinafter, each of the units is provided with its own control logic (see FIG. 6) which ascertains whether or not one of the treatment units in FIG. 1 needs regeneration. The circuitry provided for the control of the individual units U forms a regeneration signal which indicates the need for regeneration of a unit. The signals are collected at the gate 58 (an OR gate) which provides a regenerate signal to a NOR gate 59. The gate 59 is connected to the gate 60. The NOR gate 60 also receives the signal S–1. The NOR gate 61 controls operation of the gate 52 in response to the regenerate signal and S–1. When the gate 61 withholds the passage of timing signal through the gate 52 (eventually to the counter 48), the counter 48 dwells on its initial step (scanning) as indicated by the signal S–1. As long as the counter 48 dwells on the first step, the signal S–1 enables the gate 38 (FIG. 2) to continue operation of the counter 39, and scanning of the treatment tanks 15. In summation, the present invention scans the regeneration units U while withholding initiation of the regeneration program. On the other hand, when the program is begun, the scanning operation is interrupted.

The output of the gate 58 is the signal S–14 which is used elsewhere in the circuitry as will be noted. Also, a NOR gate 62 is provided with the signals S–14 to form the signal $\overline{S–14}$. The NOR gate 63 is connected to the gate 61 to provide the signal S–22.

An OR gate 64 having nine inputs also controls operation of the gate 61 wherein the binary one at any one of the inputs is connected to the gate 61.

It should be noted that the counter 48 is a by sixteen counter whereas the regeneration program provided by the gates 50 utilizes only thirteen of the sixteen steps made available by the counter 48. Therefore, on reaching the last step (S–13), it is desirable to skip the nonutilized states of the counter 48 and to this end, circuitry is provided to generate a reset pulse. The signal from the last stage (S–13) is communicated to a NOR gate 65 which provides the set signal for a flip flop 66. The set signal is synchronized by the timing signal TS which is input both to the NOR gate 65 and to the reset terminal of the flip flop 66. When the signal S–13 is low and coincides with a low value in the timing signal, the flip-flop 66 is operated to form a reset signal for the counter 48 which is reset to the S–1 state. This takes away the signal on the NOR gate 65 since the counter leaves the S–13 state, and the next high value of the timing signal resets the flip flop 66 for the next cycle of operation.

Figure 4:
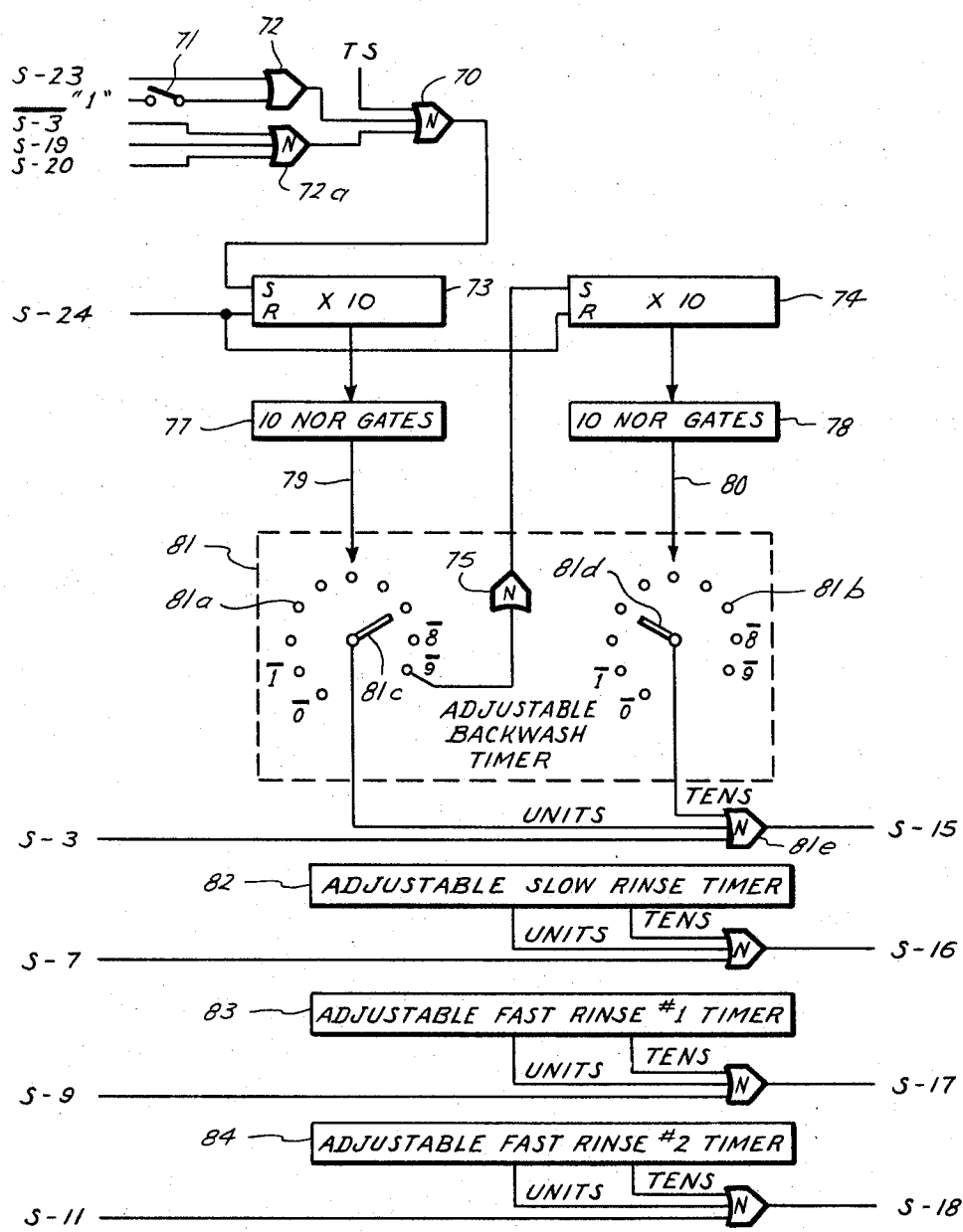
FIG. 4 is a schematic wiring diagram of circuitry means accommodating adjustments in the regeneration cycle.

Attention is directed to FIG. 4 which illustrates circuit means controlling the time intervals of certain steps in the regeneration program. The system timing signal TS is input to a NOR gate 70. The output of gate 70 is held at zero if either the manual reset switch 71 is actuated or the signal S–23 (the advance pulse for the counter 48 in FIG. 3) is a binary one, both of said signals communicating through an OR gate 72. Also, the gate 70 is enabled when $\overline{S–3}$, S–19, or S–20 is high. They are inverted by the gate 72a.

The pulses output by the gate 70 are conducted to a decade counter 73. The counter 73 is connected to a second decade counter 74 by a NOR gate 75 receiving the highest count of the counter 73 to relate the counting of the decade 74 to the counter 73. Since the clock signal of the present invention is one pulse per minute, the decade counters 73 and 74 count up to ninety-nine minutes.

The outputs of the decades 73 and 74 are decoded by NOR gates connected to each, and the NOR gates are indicated at 77 and 78. The NOR gates provide decoded signals on conductors 79 and 80, respectively, to an adjustable backwash timer within the dotted lines at 81. The timer 81 includes ten terminals exemplified by 81a for the "units" and the terminal 81b for the "tens" with each of the terminals connected to the appropriate signal from the decoders 77 and 78. Wiper arms 81c and 81d set the units and tens for the backwash interval. The wiper arms 81c and 81d are connected to a NOR gate 81e which also receives the signal S–3. The signal S–3 enables the gate 81e to output a backwash complete signal S–15. Since counting is initiated with the backwash ($\overline{S-3}$ as to gate 72a), the interval adjusted at the wipers 81c and 81d is the duration of the backwash. The signal S–24 resets the decades 73 and 74. It should be recalled that the signal S–24 is the advance program signal derived from the circuitry in FIG. 3.

An adjustable slow rinse timer 82 is shown in block diagram form. The slow rinse timer 82 is similar in construction with the backwash timer 81. As a matter of fact, the slow rinse timer 82 preferably shares the counters 73 and 74, and the decode matrices 79 and 80 and the pulse source (the NOR gate 70). The conductors indicated generally at 79 and 80 are paralleled to identical wiper arms in the timer 82 for control independent of the backwash timer 81. Also, it should be noted that the interval can be extended up to ninety-nine minutes. The parallel connection of the timers 81 and 82 provides the counting intended for the backwash program step to the slow rinse timer 82 but the timer 82 simply does not respond to the counts indicated for the timer 81 because the signal S–7 continues high which requires a low output from the NOR gate included in the timer 82. Therefore, the timer 82 does not recognize signals intended for the timer 81. The output signal which indicates completion of the slow rinse is S–16.

Initiation of the count for the slow rinse timer 82 is in response to the signal S–20. Counting is identical to the counting described previously for the timer 81.

Control over the duration of the fast rinse number one and the fast rinse number two is provided by additional adjustable timers 83 and 84. The timers 83 and 84 are enabled by the signals S–9 and S–11 to form output signals S–17 and S–18 which indicate completion of the first and second fast rinses, respectively.

Figure 5:
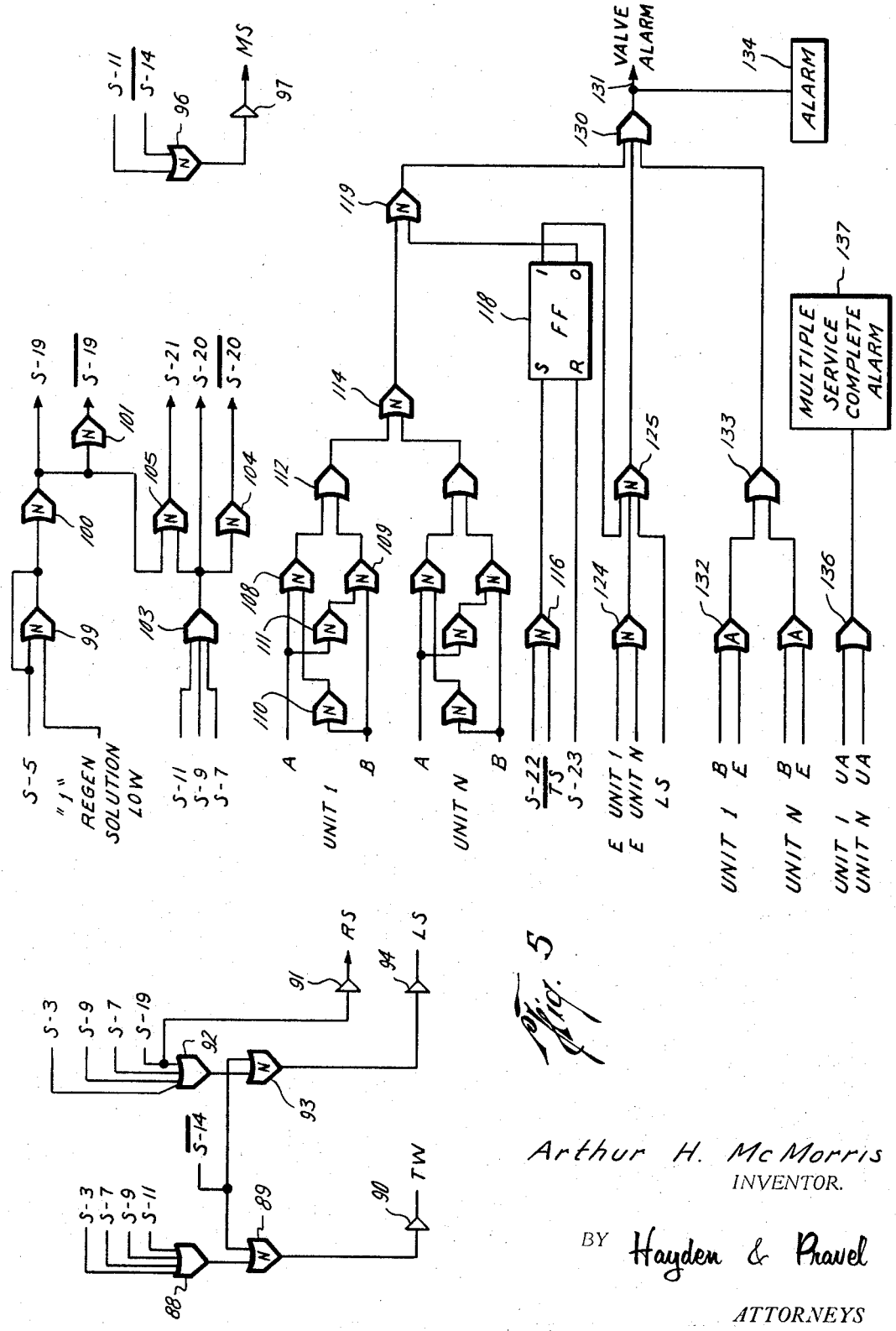
FIG. 5 is additional logical circuitry of the present invention.

Reference is next made to FIG. 5 which illustrates additional control apparatus of the present invention. As mentioned before, treated water is taken from the tank container 12 and used in the regeneration program. The valve TW opening the treated water container 12 is controlled by the signals S–3, S–7, S–9, and S–11 input to an OR gate 88. The output of the OR gate 88 is connected to a NOR gate 89 which communicates with a driver 90 providing a signal to the valve TW. Any time the program passes through backwash, or any of the rinses, and further provided that the apparatus recognizes the need for regeneration (the signal $\overline{S-14}$), then a binary one input to the gate 88 operates the valve TW.

A signal S–19 (derived from apparatus to be described) is included within the regeneration solution time (S–5) is communicated directly to a driver 91 to operate the valve RS to deliver the regeneration solution to the unit undergoing treatment. The slow rinse, the first fast rinse, and the regeneration solution time (S–7, S–9, and S–19) generate waste liquids which are therefore preferably dumped to the sewer 14. An OR gate 92 is provided with S–7, S–9, and S–19. The signal $\overline{S-14}$ enables the output of the gate 92 at the NOR gate 93 which operates the power driver 94 and the valve LS.

Usually, after the container 15 has the slow rinse and the first fast rinse, the regeneration solution remaining in the tank 15 is quite materially reduced. Because of this, it is quite often desirable to divert the rinse water of the second fast rinse from the sewer 14 and redirect it to the source 10. The signals S–11 and $\overline{S-14}$ are input to a NOR gate 96 which communicates with a driver 97 for operation of the valve MS. The valve MS is opened only during the second fast rinse to return the reasonably pure water for repurification. As will be understood by those skilled in the art, the valve MS may communicate with a separate tank for accumulation of the only slightly impure water.

FIG. 5 also illustrates circuit means wherein the regeneration solution time (S–5) is related to the actual time of delivery of regeneration solution, hereinafter known as S–19. Specifically, the signal S–5 is input to a NOR gate 99 which communicates with a second NOR gate 100. An additional input to the NOR gate 99 is a binary signal which is high when the regeneration solution is low. A sensor or other suitable device is placed at a predetermined level in the regeneration solution tank 13 to indicate delivery of a measured quantity of liquid. In practice, it may be found desirable to store the regeneration solution in a large tank and use the tank 13 to meter only enough for regeneration. The level indicator measures and dispenses the needed quantity of regeneration solution through the valve RS. The signal from the level sensor in the tank 13 is applied to the NOR gate 99 to indicate termination of the regeneration time and this signal, as previously noted, is the signal S–19.

The NOR gate 101 forms the signal $\overline{S-19}$. The signals S–7, S–9, and S–11 are input to an OR gate 103 to form an output S–20 which denotes any rinse in the regeneration program. The gate 103 is connected to the gate 104 which inverts the signal S–20 to form $\overline{S-20}$. In addition, the output of the gate 103 (any rinse) is connected to the NOR gate 105 along with the signal S–19.

The apparatus of the present invention includes means for preventing certain unwanted valve combinations in the apparatus. For instance, water flows through the line 17 and the valve A into the tanks 15 (see FIG. 1) while the valve B provides egress from the tank 15 to the storage 12. It will be appreciated that possibly catastrophic results will result from closing the valve B while the valve A is open. For unit one, there is provided a pair of NOR gates 108 and 109 which are connected to position signals provided from the valves A and B. In addition, the inverse of the valve signals is formed by gates 110 and 111. The gate 108 tests for the condition $A \cdot \overline{B}$ while gate 109 checks for the condition $\overline{A} \cdot B$. The outputs of the gates 108 and 109 are summed by an OR gate 112 and then conducted to an additional NOR gate 114. The gates 108–112, inclusive, are associated with unit one in the treatment plant P. However, since the plant P has a plurality of tanks N, preferably identical circuitry checks the valve condition of all of the tanks 16. FIG. 5 illustrates circuitry for unit N which includes an identical gating arrangement connected to the NOR gate 114. The output of the NOR gate 114 represents an alarm condition in any of the valves A and B in the plant P.

The choice of time for checking the condition of the valves A and B is made by the signals S–22 and $\overline{TS}$ input to a NOR gate 116. As previously mentioned, the gate 63 (see FIG. 3) generates the signal S–22 which relates to the start of regeneration. The NOR gate 116 is connected to the set input of a flip flop 118. Specifically, the zero output terminal of the flip flop is input to a NOR gate 119 as is the output of the gate 114. The $\overline{TS}$ signal to the NOR gate 116 relates the valve check to the delays steps in the program and withholds checking so that valves in transient are permitted to settle and fully close. The reset terminal on the flip flop 118 is provided with the signal S–23 (the pulse input to the counter 48 in FIG. 3).

Another undesirable condition in the valves provided in FIG. 1 results when the valve E is opened to admit the regeneration solution from the tank 13 while the valve LS is not open. To protect against this, the position signals from the valves E are connected to a NOR gate 124 communicating with a NOR gate 125. The position signal of the valve LS is connected to the NOR gate 125. The gate 125 is enabled by the check valve signal (one output of flip flop 118) and the result of the valve check is communicated to an OR gate 130. The OR gate 130 is connected to the gate 119 to provide an output signal valve alarm on the conductor 131.

The check valve signal from the flip flop 118 is timed relative to opening and closing of the valves E and LS so that no alarm signal is presented to the gate 130 during regeneration.

An alarm condition would occur if the valve E were opened and the valve B were open to the pure water storage facility at 12, thereby polluting the treated water. The signals position of the valves B and E on each unit are summed at an AND gate 132 which is shown connected to the valves of the first unit. Likewise, additional AND gates are included for the treatment units operated by the present invention. If both valves B and E are opened, binary ones are provided to the AND gate 132. A binary one output is communicated through an OR gate 133 to the alarm gate 130 to provide the alarm condition in the conductor 131. If desired, an alarm device such as indicated at 134 may be utilized to sound a signal.

It should be noted that the valve alarm signal in the conductor 131 defeats operation of the circuitry of the apparatus CAU. FIG. 2 diagrams the source of the signal TS (gate 35) and shows the valve alarm signal input to the gate 35. On occurrence of an alarm condition, the valve alarm input to the gate 35 becomes high and requires a binary zero output which subsists without regard to the operation of the counter communicated to the gate 35. This holds the TS signal as long as the valve alarm exists and prevents further operation of the apparatus. This, of course, prevents the initiation of the regeneration program, and most especially prevents delivery of the regeneration solution by maintaining the valve RS closed at the tank 13.

The quantity of liquid delivered by the tank 13 is preferably controlled so that the resin 16 in the tanks 15 are not overtreated or undertreated. Undertreatment could result if two or more tanks 15 might be communicated with the regeneration solution when two or more valves E are opened. The alarm device 137 indicates such a condition when UA signals are received by the gate 136. If desired, the output of the gate 136 may also be applied to the gate 130 so that multiple service completion is foreclosed by the valve alarm signal on the conductor 131 which withholds operation of the entire apparatus.

The foregoing description of circuitry and apparatus has been devoted to the system circuitry. The number of tanks is the subject of choice and results in modification of the counter 39 and decoder 40 (see FIG. 2) and other small changes. The foregoing description has attempted to describe the system circuitry with accommodations made for variation in the number of treatment units. However, FIG. 6 represents the circuitry associated with each of the units U, and is duplicated to whatever extent necessary to accommodate N units. In the accommodation of any number of N units, each one is made independent so that its control is self-contained.

The circuitry in FIG. 6 is indicated generally by the numeral 139. An off-on switch is indicated generally at 140 and is connected so that operation to the off position disconnects the circuit 139 functionally from the system circuitry. However, when the off-on switch 140 is turned on, the unit is energized and power is applied to several switches (preferably push buttons) operated to control the circuit 139. The push buttons are identified at 141, 142, and 143, and represent the regenerate control, the standby control, and the run control. They are connected to generate the signals denoted as R$eg$ PB, $\overline{Sby}$ PB and $\overline{Run}$ PB. Operation of the switch 140 also energizes a NOR gate 144 to form an output signal OS, an out-of-service signal.

An additional output taken from the switch 140 is connected through the preset counter 148. The preset counter 148 provides a normally open switch which indicates the results of a comparison. As previously discussed, each of the individual treatment units is adapted to treat a certain quantity of liquid before the chemicals therein are exhausted. This quantity of liquid can be estimated with accuracy when the untreated water does not vary in degree of pollution. Thus, if it is ascertained that five hundred thousand gallons is a reasonable limit for operation of a treatment unit 15, then the preset counter is set to five hundred thousand by adjusting decade switches (six or seven decades are usually adequate). A flow meter is provided at the output of the treatment unit. The flow of liquid through the flow meter generates pulses which advance a second counter in the present counter 128. The signal from the flow meter at the unit is input to the counter 148. The counter is advanced until coincidence with the preset count which closes the normally open switch and communicates the high signal from the off-on switch 140 to the flip flop 150. The OR gate 149 is provided with an additional signal terminating service of the unit resulting from actuation of the regenerate push button 141. The flip flop 150 forms a one at the one output to denote the service complete condition (SC). A NOR gate 151 forms a reset signal supplied to the preset counter 148 and the reset terminal of the flip flop 151. It should be noted that the flip flop 151 also generates the signal $\overline{SC}$.

The inputs to the NOR gate 151 includes $\overline{Regen}$, $\overline{S-12}$ and $\overline{TS}$. Coincidence of zeros at the NOR gate 151 provides the high signal to the reset terminals.

Certain signals are generated in the circuitry 139 for utilization by the unit logic. For instance, the signals S-1, TS, and $\overline{N}$ count are applied to an OR gate 152. The output of the gate 152, the OS signal generated by the NOR gate 144, and the $\overline{SC}$ generated by the flip flop 150 are input to the OR gate 153 to form a signal defined as U-2. The gate 154 generates U-2. Additionally, a NOR gate 155 is connected with the push button 143 and is provided with the signal $\overline{S-14}$ to generate a signal to generate a signal U-5. The signal $\overline{S-14}$ is also communicated with a NOR gate 156 which also receives an input from the push button 142 to form the signal U-4.

Additional signals are generated as will be described. The signals $\overline{S-2}$ and $\overline{S-14}$ are communicated with the NOR gate 157 which provides an output to NOR gate 158. The NOR gate 158 is connected with an input signal which is a binary one from a system control "all units run." When the apparatus is turned on and the switch "all units run" is actuated, the N units U are all provided with the signal to bring all the units to regenerated condition. The output of the gate 158 is connected to the gate 159 along with the signal OS with output defined as U-1. Also, the gate 159 is connected with a NOR gate 160 which provides $\overline{U-1}$.

An AND gate 162 is provided with inputs of $\overline{TS}$, $\overline{S-13}$, and $\overline{OS}$ ($\overline{OS}$ is provided by gate 163). The output of the gate 162 is U-3, and a NOR gate 164 forms $\overline{U-3}$.

The unit logic 139 associated with each of the units includes three flip flops 166, 168, and 170. The flip flops are provided with numerous inputs to their set and reset terminals as shown in the drawings wherein the inputs are obtained from previously-mentioned signals shown in FIG. 6. Also, some of the flip flops are interconnected. The flip flops form SBY, RUN, and REGEN. Utilization of the signals from the three flip flops will be described in greater detail hereinafter with respect to operation of the valves.

The signals OS and RUN are connected to a gate 172 which communicates with a driver 173 for operating the valve B, and the driver 174 operates the valve A. The signals OS, S-3, and $\overline{\text{REGEN}}$ are connected to the gate 175 which communicates with the drivers 176 and 177 to open the valves C and D, respectively. Also, the signals OS, $\overline{\text{S-19}}$, and $\overline{\text{REGEN}}$ are connected to the NOR gate 178 which communicates with the driver 179 for actuation of the E valve.

Additional valves are controlled by each of the unit circuit control circuits 139 provided herein. For instance, the valve F is operated by the NOR gate 180 which is provided with OS, S-21, and $\overline{\text{REGEN}}$; and the output of the gate 180 is connected to the driver 181. The valve G is controlled by the NOR gate 182 which is provided with inputs OS, S-20, and $\overline{\text{REGEN}}$. The required current level is provided with the driver 183. The unit logic 139 includes a NOR gate 184 which is provided with the inputs REGEN, $\overline{\text{SC}}$, and $\overline{\text{S-1}}$. The output forms the signal UA which can be defined as unit alarm. It should be recollected that the UA signals from each of the units is collected by the gate 136 (see FIG. 5) for sounding the multiple service complete alarm 137.

Operation of the present invention can be understood from an examination of the foregoing description and a consideration of the drawings provided herewith. However, to further amplify and illustrate the present invention, details of operation will be related to the drawings in describing the operation of the system as a whole. As an assumption for describing system operation, it might be assumed that the treatment units U are placed on line for treating water from the source 10. Treatment units function for an indefinite period of time and supply treated or purified water to the storage facility 12. Then the apparatus CAU of the present invention scans the units U to ascertain a service complete condition. Reference is made to FIG. 2 which illustrates the means providing scanning of the treatment units U. As described hereinbefore, the circuitry 25 shown in FIG. 2 provides pulses to the counter 39 at the rate of one pulse per second for generating $\overline{\text{N}}$ count signals for scanning at the NOR gates 41. Scanning is conditioned on the absence of a signal on the valve alarm and maintaining the program at the scanning step as represented by the signal S-1. The scanning mode continues indefinitely until one of the units is ascertained as being depleted and a signal is received on the conductor N unit SC provided to the NOR gates 41.

When the ion exchange media in one of the units U is depleted, and the SC signal is generated for the NOR gates 41, scanning is interrupted until the SC signal is removed from the NOR gates 41. Thereupon, the circuitry shown in FIG. 3 generates the steps of the regeneration program. A $\overline{\text{REGEN}}$ signal from the unit logic circuitry associated with the depleted unit is provided to the gate 58 (FIG. 3) which signal co-operates with the $\overline{\text{TS}}$ signal to form pulses advancing the counter 48. The counter 48 is provided with a count capacity at least equal to or exceeding the number of steps in the regeneration program. The output of the counter 48 is decoded by the matrix of gates indicated generally at 50 as the counter 48 is advanced. By way of example, the means 50 advances from the scanning mode (wherein the signal S-1 is maintained) to the step delay 1. Delay 1 is coupled through the OR gate 64 in preparation of an advance pulse for the counter 48 pending arrival of the next wave form in the signal $\overline{\text{TS}}$. The signal $\overline{\text{TS}}$, which has a frequency of one pulse per minute, withholds advancing of the counter 48 for the one minute interval to permit valves in the treatment plant P to settle. The valves A and B are closed during this interval. The next pulse provided to the counter 48 advances the program generated by the gates 50 to the backwash step. During backwash, the valves C and D are opened at the unit and the valve LS is opened to the sewer 14. The extent of the backwash interval is provided by the backwash timer 81 shown in FIG. 4. On expiration of the predetermined interval, the gate 81e provides a signal S-15 to the gate 64 to further advance the program in synchronism with the $\overline{\text{TS}}$ signal input to the gate 52 (see FIG. 3). The program then advances to the next step which is delay 2. During this step, valves are closed and an interval is allowed for the valves to settle in place and to close firmly. The next step in the program is the regeneration solution time wherein the regeneration solution in the tank 13 is passed through the valve E into the treatment unit for regenerating the resin therein. The valve E is opened by the unit logic circuitry 139 and the valve RS is opened in response to the signal S-19. It should be recalled that the signal S-19 is related to the signal S-5 (provided by the program) with the exception that the signal S-19 is terminated when the level of solution in the container 13 drops below a predetermined level. In addition, the valve LS to the sewer 14 and the valve F open to drain the regeneration solution out of the tank 15. On conclusion of the regeneration of the resins in the depleted tank, the signal indicating low level in the tank 13 which is input to the gate 99 (see FIG. 5) terminates operation of the program step in sychronism with the $\overline{\text{TS}}$ signal (see FIG. 3) and advances the counter 48 one more step.

The next step is delay step 3 which is similar to the previous delay steps. Without additional detailed elaboration, it will be recognized that the remainder of the steps of the program are similar to one another so that the foregoing description is sufficient to illustrate operation of the present apparatus. However, attention is directed to the last step of the program which is a signal indicating that the regeneration has been completed.

When the last step of the program is reached, the signal S-13 is input to the flip flop 66 (see FIG. 3) which forms a reset pulse for the counter 48. The counter 48 is reset and returns to dwell on the scanning step as indicated the signal S-1. The signal S-1 is returned to the scanning apparatus illustrated in FIG. 2 whereupon the scanning counter 39 reinitiates its scanning at the rate of one inspection per second, taking up with the unit U immediately following the unit just recharged. Scanning thereafter continues as previously described.

Certain alterations may be incorporated with the apparatus of the present invention. For instance, reference is made to FIG. 1 which illustrates the treatment plant P. As will be recognized by those skilled in the art, the treatment plant P may be modified to any extent to incorporate an unlimited number of treated units U, if desired. Also, the units U may be arranged in parallel to one another as shown in FIG. 1, or if very pure water is desired, such as for use in boilers or the like, units may be arranged serially whereby water is treated consecutively in two or more units. The present invention is constructed and arranged to accommodate such a rearrangement in response to the sensor means providing an indication of depletion of the serially-arranged treatment units.

Reference is made to the program generating apparatus in FIG. 3 which may be altered if desired. One such alteration might be the variation of the program itself. To this end, the counter 48 may be expanded to make available any larger number of program steps desired and additional gates added in the decoding matrix to provide output signals representative of each of the steps of such an enlarged program. By way of example, additional steps may be added to the program after the regeneration solution time to provide for automatic refilling of the container 13 for the regeneration solution. Alternatively, such steps can be initiated automatically on conclusion of the time provided for regeneration and may be performed simultaneously with succeeding steps on down to the last step of the program. In such event, it might be desirable to provide an interlock withholding the last step (regeneration complete) until the tank 13 has been refilled.

Reference is made to the timers indicated in FIG. 4 which may be varied in any manner known to those skilled in the art. For instance, another decade may be added to provide sums of up to nine hundred and ninety-nine minutes. As an alternative, it may be determined that the extent of backwash and the rinses is best determined by the volume of water used in these program steps. If such is the case, a flow meter can be used in co-operation with a preset timer (similar to the counter 148 shown in FIG. 6) to control the amount of backwash and rinse.

Without overextending the examples of modification in the present invention, the appended claims are intended to define the scope of the present invention.

The foregoing disclosure and description of the invention is illustrative and explanatory thereof and various changes in the size, shape, and materials, as well in the details of the illustrated construction, may be made within the scope of the appended claims without departing from the spirit of the invention.

What is claimed is:

1. In a water treatment plant adapted to receive untreated water, a plurality of treatment tanks havng ion exchange media therein with control valves, operatively connected thereto, and regeneration means, the invention comprising:
    (a) a plurality of sensor means for indicating depletion of said ion exchange media in any one of the plurality of treatment tanks;
    (b) means for successively scanning said sensor means to determine which of said treatment tanks has depleted ion exchange media;
    (c) memory means for storing a regeneration program;
    (d) valve control means for operating said valves in the treatment plant;
    (e) circuit means for recalling from said memory means the steps of the regeneration program when said scanning means determines depletion of the ion exchange media in said one treatment tank; and
    (f) means for executing the program steps by forming control signals in said valve control means.

2. The invention of claim 1 including:
    (a) means for forming an indication signaling that the regeneration program is being executed; and
    (b) means responsive to such an indication to interrupt operation of said scanning means.

3. The invention of claim 1 including delay means in the regeneration program occurring after said valves are operated to provide adequate time for valve operations.

4. The invention of claim 1 wherein the regeneration program includes means providing for backwash of said ion exchange means, regeneration by flowing regeneration solution through the ion exchange media, and means providing multiple rinses for removing any traces of regeneration solution.

5. The invention of claim 4 including:
    (a) a tank adapted for storing treated water;
    (b) means for backwashing said one treatment tank with treated water from said storage tank.

6. The invention of claim 4 including means for setting individually the duration of the backwash and rinses for each of said treatment tanks.

7. The invention of claim 1 including:
    (a) valve position indicator means for indicating whether said control valves are opened or closed;
    (b) means for testing said valve indicator means for undesired combinations of valve positions; and
    (c) means operated by said testing means for interrupting execution of the steps of the regeneration program.

8. The invention of claim 1 wherein said scanning means comprises a counter having a count capacity of at least the number of said plurality of treatment tanks, a decoding matrix for forming scan signals from said counter, and circuit means connected to each of said sensor means which are enabled by a scan signal from said decoding matrix.

9. The invention of claim 1 including a counter having a count capacity of at least the number of steps in the regeneration program, a decoding matrix for forming a program step signal, a circuit for forming program advancer signals input to said counter, and circuit means for ascertaining completion of a program step to operate the last named means for forming a program advance signal to thereby advance the counter to the next program step.

10. The invention of claim 9 including means for forming a reset pulse after execution of the last step in the program and applying said reset pulse to reset said counter.

11. The invention of claim 1 including means in said memory means for providing intervals of timed regeneration for said ion exchange media, said intervals being determined by individual timer means.

12. The invention of claim 11 wherein said timer means receives a start signal at initiation of regeneration program steps stored in said memory means.

13. The invention of claim 1 including:
    (a) individual valve control means for the individual valves associated with the individual treatment tanks;
    (b) second circuit means associated with each of the treatment tanks for forming signals indicating the desired operative condition of the individual treatment tanks;
    (c) third circuit means operated by said second circuit means for forming individual operative signals for each of the valves on receiving a signal from the second circuit means and a valve control signal from said program-executing means.

14. The invention of claim 1 including:
    (a) clock means for generating pulses directed to said scanning means to continue scanning until sensing a treatment tank having exhausted ion-exchange media;
    (b) means for interrupting further scanning by said scanning means until completion of the regeneration of the ion exchange media; and,
    (c) means for restarting operation of said scanning means when the exhausted ion exchange media is regenerated.

References Cited

UNITED STATES PATENTS

| | | | |
|---|---|---|---|
| 2,046,265 | 6/1936 | Hewetson | 210—277 X |
| 2,315,223 | 3/1943 | Riche | 210—278 X |
| 2,351,648 | 6/1944 | Whitlock | 210—85 |
| 3,012,156 | 12/1961 | Simmons | 210—142 X |
| 3,160,008 | 12/1964 | Gestler | 210—89 X |
| 3,164,550 | 1/1965 | Lamkin | 210—89 |

OTHER REFERENCES

Cochrane Uni-Pac Packaged Demineralizer Two Bed Model D bulletin (4 pp., copyright 1961) Cochrane Div., Crane Co., Philadelphia, Pa.

REUBEN FRIEDMAN, *Primary Examiner.*

J. ADEE, *Assistant Examiner.*